United States Patent [19]

Ota et al.

[11] Patent Number: 4,857,291
[45] Date of Patent: Aug. 15, 1989

[54] PROCESS OF PRODUCING PLATE-SHAPED CALCIUM CARBONATE PARTICLES

[75] Inventors: Yoshio Ota; Norifumi Goto; Iwao Motoyama; Tetsushi Iwashita; Kunio Nomura, all of Ogaki, Japan

[73] Assignee: Yabashi Industries Co., Ltd., Gifu, Japan

[21] Appl. No.: 166,439

[22] Filed: Mar. 10, 1988

[51] Int. Cl.$^4$ .......................... C09C 1/02; C01F 5/24; C01F 11/18
[52] U.S. Cl. .................................... 423/430; 106/464
[58] Field of Search .............. 423/430, 432, 165, 168; 106/306, 464

[56] References Cited

U.S. PATENT DOCUMENTS

| | | |
|---|---|---|
| 1,540,391 | 6/1925 | Gelleri .................................. 423/165 |
| 3,420,775 | 1/1969 | Cadwallader ....................... 423/165 |
| 3,833,464 | 9/1974 | Rolfe .................................... 423/165 |
| 4,272,498 | 6/1981 | Faatz .................................... 423/430 |

FOREIGN PATENT DOCUMENTS 2310023 9/1973 Fed. Rep. of Germany ...... 423/432

Primary Examiner—Gary P. Straub
Attorney, Agent, or Firm—Koda and Androlia

[57] ABSTRACT

Disclosed is a novel process of producing plate-shaped calcium carbonate particles. The process comprises the steps of adding aqueous calcium hydrogen carbonate solution with a temperature of less than 50° C. into an aqueous medium bath held at a temperature of not less than 50° C. to generate plate-shaped calcium carbonate particles in the bath, the temperature of the bath being kept not less than 50° C. during the addition of the aqueous calcium hydrogen carbonate solution; and recovering the generated plate-shape calcium carbonate particles.

7 Claims, 5 Drawing Sheets

PROCESS OF PRODUCING PLATE-SHAPED CALCIUM CARBONATE PARTICLES

BACKGROUND OF THE INVENTION

I. Field of the Invention

This invention relates to a process of producing plate-shaped calcium carbonate particles which are useful as a filler or a reinforcing material of various materials such as rubbers, papers, plastics and paints.

II. Description of the Prior Art

The calcium carbonate actually used in industrial fields may be roughly divided into two groups, i.e., heavy calcium carbonate and precipitated calcium carbonate. Heavy calcium carbonate is prepared by mechanically pulverizing limestone into fine particles. The shape of the heavy calcium carbonate particles is irregular and the particle size is in the range of several micrometers to 150 μm.

On the other hand, precipitated calcium carbonate may be divided into two groups, i.e., so called light calcium carbonate with a particle size of 1-3 μm and so called colloidal calcium carbonate with a particle size of 0.02-0.1 μm. Precipitated calcium carbonate particles are currently manufactured by "liquid-liquid" process or by "liquid-gas" process. In the liquid-liquid process, a solution containing carbonate ion such as sodium carbonate and ammonium carbonate solution is reacted with a solution of a calcium compound such as calcium chloride and calcium acetate to produce calcium carbonate. In the liquid-gas process, a slurry of calcium hydroxide is reacted with carbon dioxide gas to produce calcium carbonate. In industrial fields, the liquid-gas process is usually employed and by changing the reaction conditions such as the concentration of the calcium hydroxide slurry, reaction temperature, manner of reaction and whether or not adding an additive, calcium carbonate particles with various shapes and sizes may be obtained. That is, calcium carbonate particles with a shape of spindle, pillar and cubic may be obtained. Further, combined needle-shaped calcium carbonate particles may be obtained.

However, in the prior art, plate-shaped calcium carbonate particles have not yet been produced in industrial field.

SUMMARY OF THE INVENTION

Accordingly, the object of the present invention is to provide a process of producing plate-shaped calcium carbonate.

The present invention provides a process of producing plate-shaped calcium carbonate particles comprising the steps of adding aqueous calcium hydrogen carbonate solution with a temperature of not more than 50° C. into an aqueous medium bath held at a temperature of not less than 50° C. to generate plate-shaped calcium carbonate particles in the bath, the temperature of the bath being kept not less than 50° C. during the addition of the aqueous calcium hydrogen carbonate solution; and recovering the generated plate-shaped calcium carbonate particles.

According to the process of the present invention, plate-shaped calcium carbonate particles with a particle size of, for example, 3-20 μm and a thickness of, for example, 0.6-4 μm may be obtained in an economical way. The plate-shaped calcium carbonate particles may be used as a filler or reinforcing material of various materials such as rubbers, papaers, plastics and paints.

Since the particles are plate-shaped, they are easily aligned in a regular way, so that when contained in a material as a filler or a reinforcing material, the particles may confer high smoothness and an excellent gloss to the material. Further, the particles may confer high electric resistance, high modulus of elasticity and excellent damping characteristics to the material. Still further, it is expected that rubbers, papers, plastics and paints as well as new materials with totally new and unexpected characteristics may be developed. As described below, since the calcium hydrogen carbonate solution may be obtained from very cheap materials, the process of the present invention is very economical, so that it is useful in industrial fields.

DETAILED DESCRIPTION OF THE PREFERRED EMBODIMENTS

Figure 1:
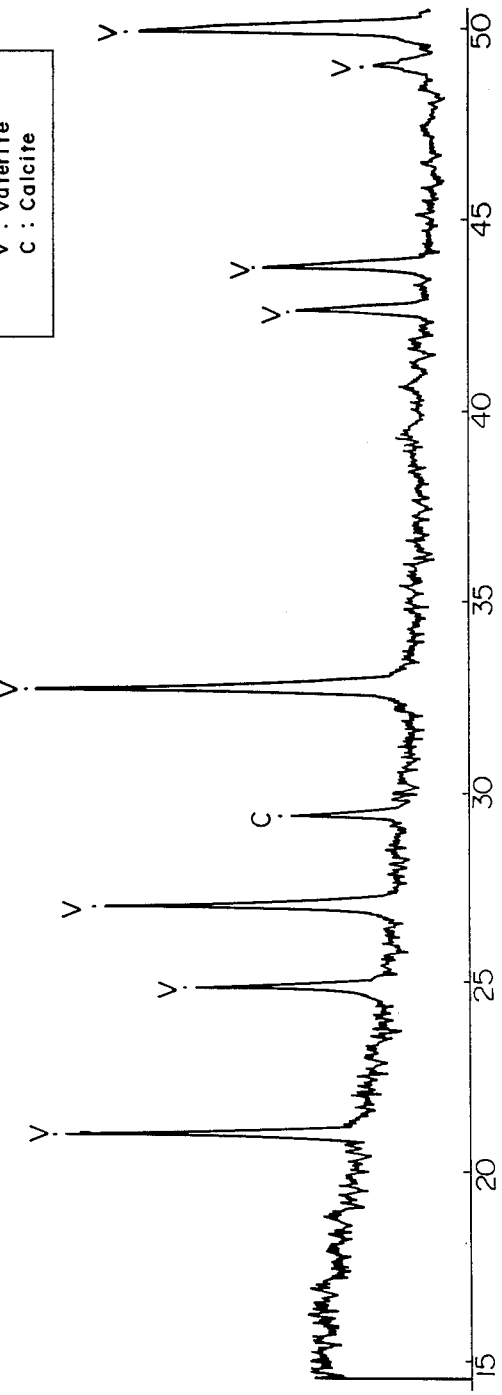
FIGS. 1 to 3 are X-ray diffraction profiles of the plate-shaped particles obtained in the examples of the preseht invention.

In the process of the present invention, an aqueous calcium hydrogen carbonate solution is added to an aqueous medium bath. The temperature of the aqueous calcium hydrogen solution is not more than 50° C. and preferably not more than 30° C. The concentration of the aqueous calcium hydrogen carbonate solution may preferably be 0.1-0.4% by weight. The aqueous calcium hydrogen carbonate solution may contain dissolved calcium carbonate.

Although the aqueous medium may contain any substance as long as the generation of the plate-shaped calcium carbonate particles is not hindered, it is preferred that the aqueous medium be water, aqueous calcium hydrogen carbonate solution or aqueous calcium carbonate slurry. Among these, water is most preferred. The temperature of the aqueous medium bath is not less than 50° C., and may preferably be 65°-90° C. The temperature of the bath should be kept not less than 50° C. during the addition of the aqueous calcium hydrogen carbonate solution. In view of obtaining plate-shaped calcium carbonate particles with a uniform particle size, it is preferred that the temperature of the bath be kept constant.

The aqueous calcium hydrogen carbonate solution may be added to the aqueous medium bath as a continuous flow or dropwise. Alternatively, the aqueous calcium hydrogen carbonate solution may be injected into the bath. The addition of the aqueous calcium hydrogen carbonate to the bath may be conducted continuously or intermittently. The rate of adding the aqueous calcium hydrogen carbonate solution is not critical and may be, for example, 10-300 ml/min. per 1,000 ml of the aqueous medium. It is preferred that the bath be stirred during the addition of the calcium hydrogen carbonate solution.

By the above-mentioned step, late-shaped calcium carbonate particles with an average particle size of, e.g., 3-20 μm and a thickness of, e.g., 0.6-4 μm are generated and precipitated in the bath.

The thus formed plate-shaped calcium carbonate particles are then recovered. The recovery may be conducted by any of the conventional methods such as filtration, evaporation of water and decantation. When the addition of the aqueous calcium hydrogen carbonate solution is conducted continuously, the recovery of the plate-shaped calcium carbonate particles may preferably be conducted continuously, and when the addition of the aqueous calcium hydrogen carbonate solution is conducted intermittently, the recovery of the plate-shaped calcium carbonate particles may preferably be conducted intermittently. In a preferred mode of the process of the present invention, the addition of the aqueous calcium hydrogen carbonate solution is conducted continuously to overflow the medium containing the generated plate-shaped calcium carbonate particles and the plate-shaped calcium carbonate particles are recovered from the overflowed medium. Thus, it should be noted that the aqueous medium is needed only in the initial stage and it is not necessary to add the additional aqueous medium during the process.

The aqueous calcium hydrogen carbonate solution which is the starting material of the above-mentioned step may be obtained by any conventional method. For example, calcium hydroxide slurry is continuously made into aqueous calcium hydroxide solution using a filter and a fixed output pump, and the calcium hydroxide solution is continuously reacted with carbon dioxide gas or a carbon dioxide-containing gas to continuously provide aqueous calcium hydrogen carbonate solution. Alternatively, carbon dioxide gas or a carbon dioxide-containing gas is added with pressure into an aqueous suspension of calcium carbonate to obtain aqueous hydrogen carbonate solution using a filter and a fixed output pump. Still further, aqueous calcium hydrogen carbonate solution may be obtained by spraying carbon dioxide gas or a carbon dioxide-containing gas and aqueous calcium hydroxide together from a nozzle atomizer. It is preferred that the aqueous calcium hydrogen carbonate solution be provided in a continuous manner so that the process of the present invention may be conducted in a continuous manner.

Thus, since the aqueous calcium hydrogen carbonate solution, which is the starting material of the process of the present invention, may be produced from heavy calcium carbonate or limestone and a source of carbon dioxide gas, both of which are very cheap, the process of the present invention can be conducted in a very economical way. If there is a naturally occurring water containing calcium hydrogen carbonate in, for example, a stalactite grotto or the like, the process of the present invention may be conducted even more economical way.

The present invention will now be described in more detail by way of examples. The examples are presented for the illustration purpose only and should not be interpreted in any restrictive way.

EXAMPLE 1

Lime (CaO) was added into stirred water with a temperature of about 80° C. to produce a calcium hydroxide slurry with a concentration of about 11 g/100 ml, and the slurry was diluted with water to a concentration of about 0.5-1.0 g/100 ml. The diluted slurry was stored in a slurry tank. From the thus obtained calcium hydroxide slurry, aqueous calcium hydroxide solution was produced at a rate of 70-95 ml/min. using a filter and a fixed output pump. The thus obtained aqueous calcium hydroxide solution is then reacted with carbon dioxide gas (100% $CO_2$) with a flow rate of 1 liter/min. and a pressure of 1.5 kg/cm$^2$ to continuously provide aqueous calcium hydrogen carbonate solution. The thus produced aqueous hydrogen carbonate solution was poured dropwise with a pouring rate of 70-95 ml/min. into 1 liter of water in a bath with a temperature of 65° C. to 70° C. to precipitate substantially hexagonal plate-shaped calcium carbonate particles. The precipitated particles are filtered and dewatered, and then dried at about 100° C. using an electric drier to obtain substantially hexagonal plate-shaped calcium carbonate particles (Sample A).

Figure 2:
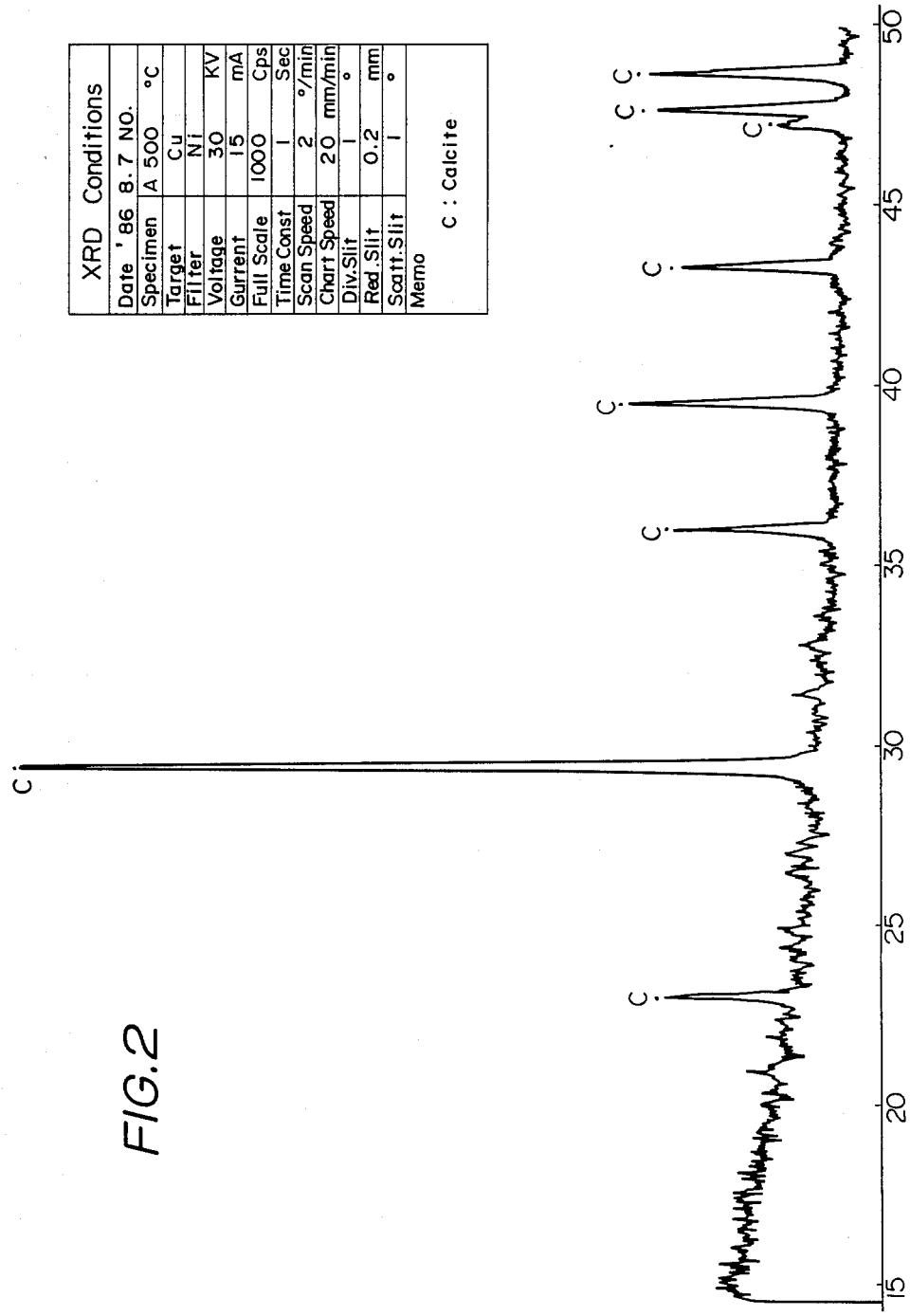
Figure 4:
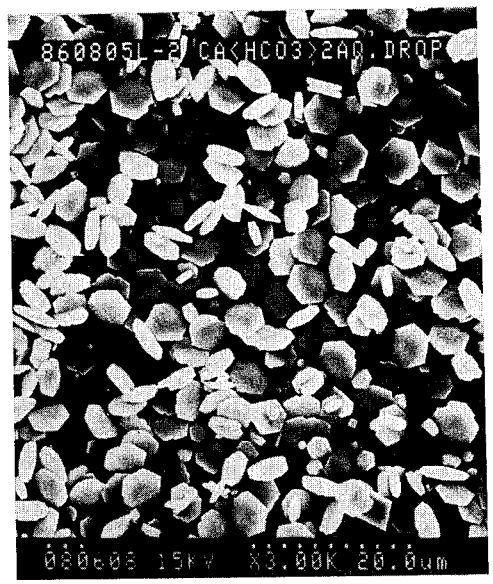
FIGS. 4 to 7 are photographs of the plate-shaped particles obtained in the examples of the present invention, which photographs are taken with a scanning electromicroscope (SEM).
Figure 5:
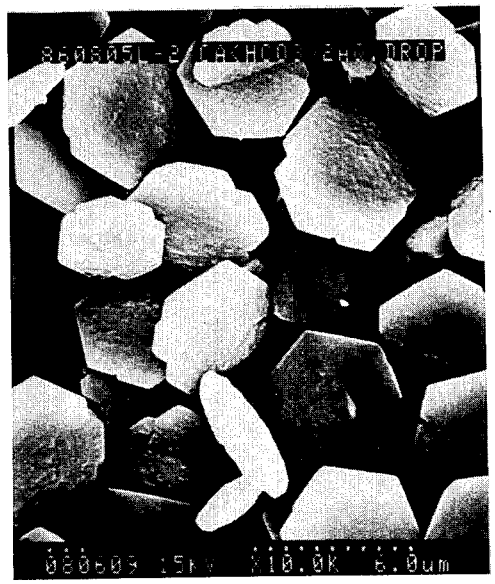
Figure 6:
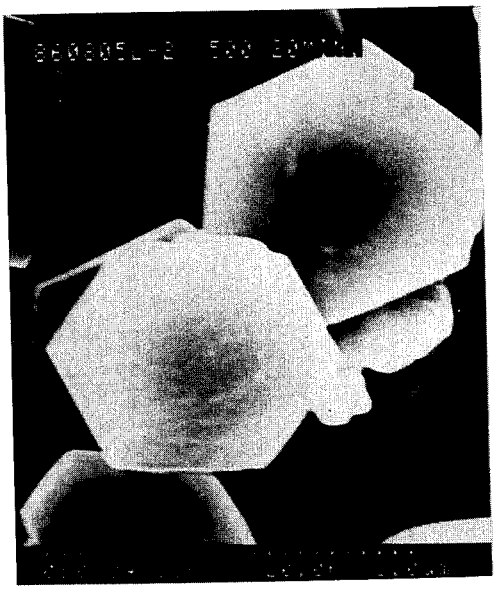

FIGS. 4 and 5 are SEM photographs of Sample A. FIGS. 4 and 5 clearly show that the particles of Sample A obtained by the process of the present invention have substantially hexagonal plate shape. FIG. 1 shows X-ray diffraction curve of Sample A. It can be seen from FIG. 1 that most of the particles are in vaterite crystals. FIG. 6 shows the SEM photograph of Sample A after heating at 500° C. for ⅓ hours in an electric furnace (Muffle furnace). As can be seen from FIG. 6, the hexagonal shape of the particles were retained after the heat treatment. FIG. 2 shows X-ray diffraction curve of Sample A after the heat treatment. As can be seen from FIG. 2, most of the vaterite crystals were converted into calcite crystals.

EXAMPLE 2

Figure 3:
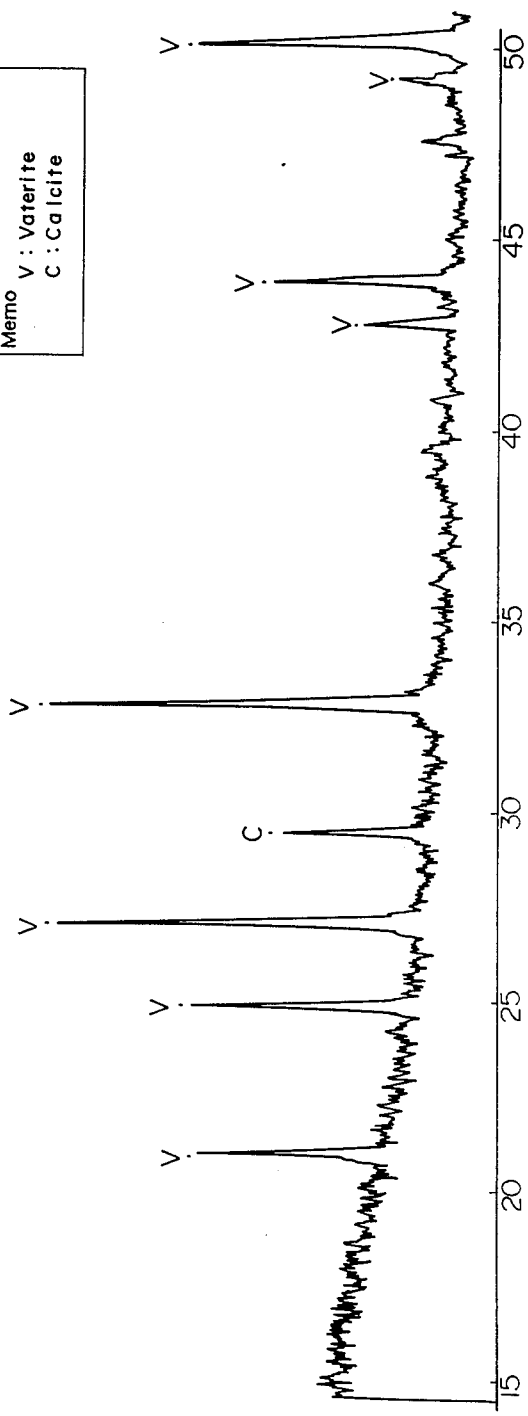
Figure 7:

Aqueous calcium hydroxide solution was continuously produced at a rate of 125-150 ml/min. in the same manner as in Example 1. Aqueous calcium hydrogen carbonate solution was continuously produced as in Example 1 and was poured at a rate of 125-150 ml/min. into 1 liter of stirred water in a bath with a temperature of 74°-90° C. to precipitate substantially hexagonal plate-shaped calcium carbonate particles. The precipitate was treated as in Example 1 to obtain Sample B. The SEM photograph of Sample B is shown in FIG. 7. FIG. 7 also shows that the particles of Sample B obtained by the process of the present invention have substantially hexagonal plate shape. FIG. 3 shows X-ray diffraction curve of Sample B. It can be seen from FIG. 3 that most of the particles are in vaterite crystals, as in Sample A.

We claim:

1. A process of producing plate-shaped calcium carbonate particles comprising the steps of mixing an aqueous calcium hydrogen carbonate solution of a concentration of 0.1-0.4 % by weight and with a temperature of not more than 50° C. into water held at a temperature of between 65° C. and 90° C. to generate plate-shaped calcium carbonate particles in the water, the temperature of the water being kept between 65° C. and 90° C. during the mixing of the aqueous calcium hydrogen carbonate solution into the water; and recovering the generated plate-shaped calcium carbonate particles.

2. The process of claim 1, wherein the addition of the aqueous calcium hydrogen carbonate solution and the recovery of the generated plate-shaped calcium carbonate particles are conducted continuously.

3. The process of claim 1, wherein the addition of the aqueous calcium hydrogen carbonate solution and the recovery of the generated plate-shaped calcium carbonate particles are conducted intermittently.

4. The process of claim 1, wherein the temperature of the aqueous calcium hydrogen carbonate solution is not more than 30° C.

5. The process of claim 1, wherein the temperature of the bath is kept constant during the addition of the aqueous calcium hydrogen carbonate solution.

6. The process of claim 1, wherein the addition of the aqueous calcium hydrogen solution is conducted at an adding rate of 10–300 ml/min. per 1,000 ml of the aqueous medium.

7. The process of claim 1, wherein the particles has an average particle size of 3 to 20 $\mu$m and an average thickness of 0.6 $\mu$m to 4 $\mu$m.

* * * * *